(12) United States Patent
Kato et al.

(10) Patent No.: US 10,712,193 B2
(45) Date of Patent: Jul. 14, 2020

(54) LIQUID LEVEL DETECTING DEVICE

(71) Applicant: Yazaki Corporation, Tokyo (JP)

(72) Inventors: Shinpei Kato, Makinohara (JP);
Shintaro Nakajima, Makinohara (JP)

(73) Assignee: YAZAKI CORPORATION,
Minato-ku, Tokyo (JP)

( * ) Notice: Subject to any disclaimer, the term of this patent is extended or adjusted under 35 U.S.C. 154(b) by 188 days.

(21) Appl. No.: 15/982,247

(22) Filed: May 17, 2018

(65) Prior Publication Data
US 2018/0348042 A1    Dec. 6, 2018

(30) Foreign Application Priority Data

Jun. 5, 2017    (JP) .................................. 2017-111090

(51) Int. Cl.
*G01F 23/38*    (2006.01)
*G01D 5/14*    (2006.01)
*G01D 11/24*    (2006.01)

(52) U.S. Cl.
CPC .............. *G01F 23/38* (2013.01); *G01D 5/145* (2013.01); *G01D 11/245* (2013.01); *F17C 2250/0413* (2013.01)

(58) Field of Classification Search
CPC ........ G01F 23/603; G01F 23/38; G01D 5/145; G01D 11/245; F17C 2250/0413
See application file for complete search history.

(56) References Cited

U.S. PATENT DOCUMENTS

| 2005/0083045 | A1 | 4/2005 | Miyagawa |
| 2005/0103103 | A1 | 5/2005 | Newman et al. |
| 2008/0072668 | A1* | 3/2008 | Miyagawa ............ G01F 23/363 |
| | | | 73/319 |
| 2008/0231267 | A1 | 9/2008 | Miyagawa et al. |
| 2015/0362356 | A1* | 12/2015 | Fukuhara ................ G01F 23/38 |
| | | | 73/314 |
| 2016/0047686 | A1 | 2/2016 | Terada |

FOREIGN PATENT DOCUMENTS

| CN | 101271013 A | 9/2008 |
| JP | 2005-265468 A | 9/2005 |
| JP | 5176997 B2 | 4/2013 |
| JP | 2014-190953 A | 10/2014 |

OTHER PUBLICATIONS

Communication dated May 28, 2019, issued by the Japanese Patent Office in counterpart Japanese Application No. 2017-111090.

* cited by examiner

*Primary Examiner* — Suman K Nath
(74) *Attorney, Agent, or Firm* — Sughrue Mion, PLLC

(57) ABSTRACT

A liquid level detecting device includes a sensor housing, a holder held rotatably by the sensor housing, a float arm fixed to the holder, a float attached to the float arm and following a surface level of liquid stored in a tank, a magnet provided in the holder, and a Hall element detecting a displacement of the magnet. The float arm is fixed to the holder so as to extend in a direction perpendicular to a rotation axis of the holder. The sensor housing has stoppers which restrict a rotation angle range of the holder to a first rotation angle by bringing a portion of the float arm, which is positioned between a tip of the float arm and the rotation axis, into contact with one of the pair of first stoppers.

3 Claims, 8 Drawing Sheets

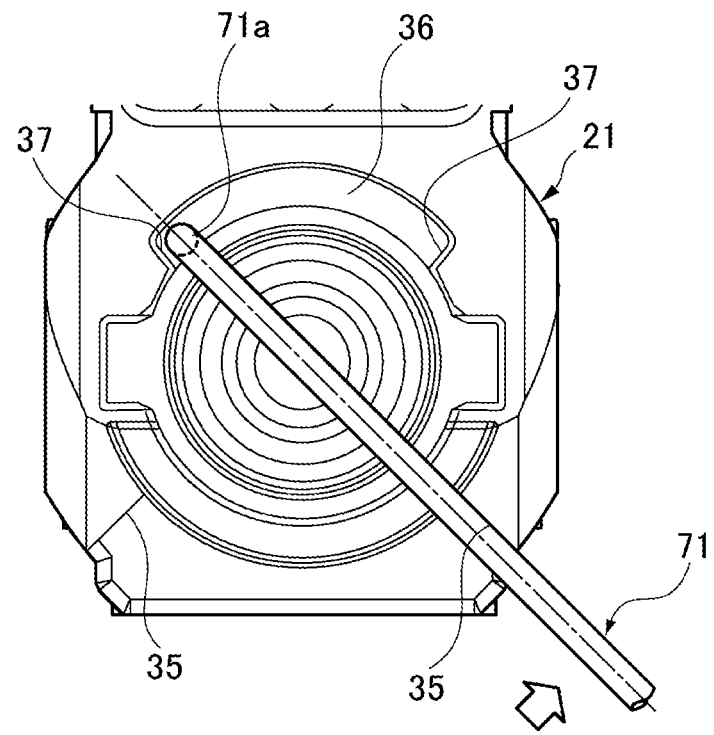
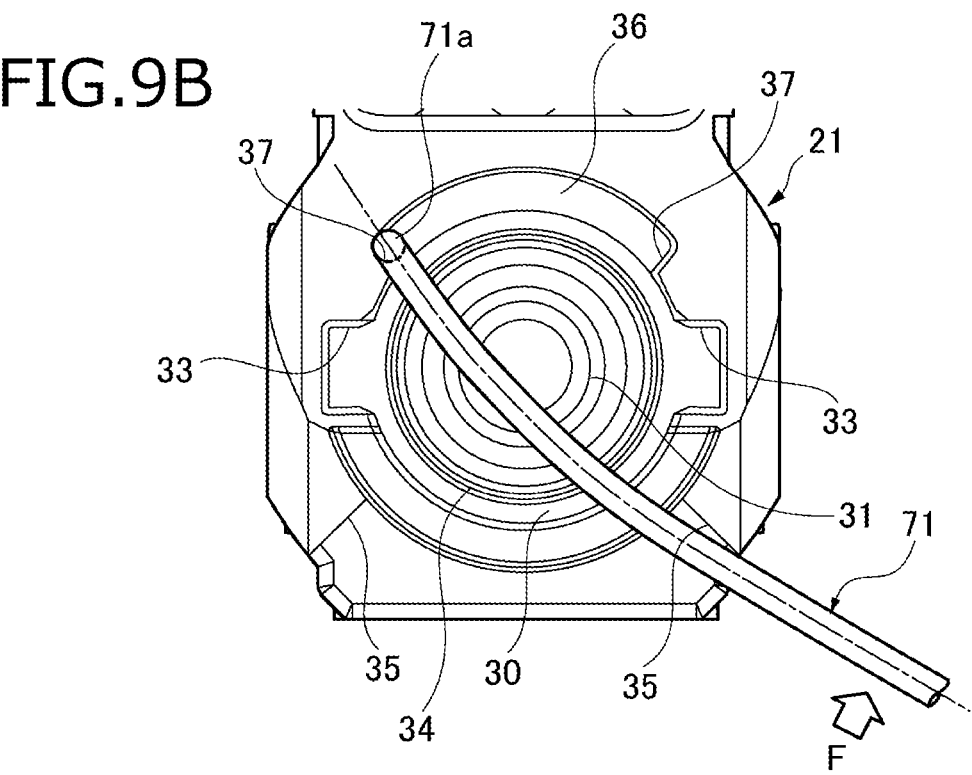

LIQUID LEVEL DETECTING DEVICE

CROSS REFERENCE TO RELATED APPLICATIONS

This application is based on Japanese Patent Application (No. 2017-111090) filed on Jun. 5, 2017, the contents of which are incorporated herein by reference.

BACKGROUND OF THE INVENTION

1. Field of the Invention

The present invention relates to a liquid level detecting device.

2. Description of the Related Art

Liquid level detecting devices for detecting a level of liquid stored in a tank are equipped with a device main body having a Hall element, a holder in which a magnet is provided so as to be rotatable with respect to the device main body, a float arm whose base portion is attached to the holder, and a float that is attached to a tip portion of the float arm (refer to JP-B-5176997, for example).

In liquid level detecting devices of the above kind, the float arm swings following the surface of liquid and the holder rotates with respect to the device main body. The Hall element provided in the device main body detects a variation of the magnetic flux generated by the magnet and a liquid level is detected on the basis of a result of the detection of the magnetic flux variation. In liquid level detecting devices of this type, the float arm is fixed to the holder and the rotation angle range of the holder is restricted in such a manner that a tip portion of a bent portion, closer to its base-side end than the position on it where it crosses the rotation axis of the holder is, of the float arm comes into contact with a restriction member.

Incidentally, in liquid level detecting devices having the above configuration, at the time of, for example, assembling, there may occur an event that the float arm comes into contact with a nearby member and the tip portion of the bent portion of the float arm comes into contact with a restriction member (stopper) of the device main body with a strong force. In this case, a heavy load acts on a float arm fixing portion of the holder, as a result of which the float arm may come off the holder or support portions that support the holder rotatably or other portions may be deformed. If the float arm fixing portion or the holder support portions are reinforced so as to be able to endure such a heavy load, resulting complication in structure would cause a cost or size increase.

SUMMARY OF THE INVENTION

The present invention has been made in view of the above circumstances, and an object of the invention is therefore to provide a liquid level detecting device in which a float arm fixing portion etc. can endure a load applied from the float arm without incurring a cost or size increase.

To attain the above object, the invention provides liquid level detecting devices of the following items (1) to (5):

(1) A liquid level detecting device including:
a sensor housing;
a holder which is held rotatably by the sensor housing;
an arm fixing portion provided in the holder;
a float arm which has a base portion fixed to the holder by the arm fixing portion;
a float which is attached to a tip portion of the float arm and varies in position following a surface level of liquid stored in a tank;
a magnet provided in the holder; and
a Hall element which is provided in the sensor housing and detects a displacement of the magnet of the holder,
wherein the float arm is fixed to the holder so as to extend in a direction perpendicular to and cross to a rotation axis of the holder; and
wherein the sensor housing has a pair of first stoppers which restrict a rotation angle range of the holder to a first rotation angle by bringing a portion of the float arm, which is positioned between a tip of the float arm and the rotation axis, into contact with one of the pair of first stoppers.

(2) The liquid level detecting device according to item (1), wherein the sensor housing has a pair of second stoppers which restrict the rotation angle range of the holder to a second rotation angle which is wider than the first rotation angle of the pair of first stoppers by bringing a portion of the float arm, which is positioned between a base end of the float arm and the rotation axis, into contact with one of the pair of second stoppers.

(3) The liquid level detecting device according to item (2), wherein a first distance between the rotation axis and a first contact position where the float arm is brought into contact with the one of the pair of first stoppers is longer than a second distance between the rotation axis and a second contact position where the float arm is brought into contact with the one of the pair of second stoppers.

(4) The liquid level detecting device according to item (2) or (3), wherein the float arm is brought into contact with the one of the pair of second stoppers when the holder is rotated further after the float arm is brought into contact with the one of the pair of first stoppers.

(5) The liquid level detecting device according to any one of items (1) to (3), wherein an air gap is existed between the one of the pair of second stopper and the portion of the float arm, which is positioned between the base end of the float arm and the rotation axis at a timing when the float arm is brought into contact with the one of the pair of first stoppers.

In the liquid level detecting device having the above configurations, the first stoppers restrict the rotation of the holder in such a manner that the portion, closer to its tip than the position on it where it crosses the rotation axis of the holder is, of the float arm comes into contact with one of the first stoppers. Thus, the torque acting on the arm fixing portion (of the holder) for fixing the float arm can be made as weak as possible in contrast to the case of a structure in which the rotation of the holder is restricted in such a manner that a portion, closer to its base-side end than the position on it where it crosses the rotation axis of the holder is, of the float arm comes into contact with a stopper. With this measure, even if a strong force is applied to the float arm as a result of the float arm's coming into contact with a nearby member at the time of, for example, assembling, a resulting load acting on the arm fixing portion can be suppressed. As a result, the arm fixing portion can endure a load applied from the float arm without the need for reinforcing the arm fixing portion with a cost or size increase.

Since the load applied to the holder is suppressed, the load acting on portions (of the sensor housing) for supporting the holder is reduced. As a result, the influence of resulting deformation etc. of the support portions on detection of a liquid surface level can be suppressed and high detection accuracy can be maintained.

In the liquid level detecting device having the above configurations, if an overload is exerted on the float arm, the float arm being in contact with a first stopper comes into contact with a second stopper. In this manner, the overload applied to the float arm is received in a distributed manner by the first stopper and the second stopper. Thus, the load on the arm fixing portion can be reduced further.

The invention makes it possible to provide a liquid level detecting device in which a float arm fixing portion etc. can endure a load applied from a float arm without incurring a cost or size increase.

The invention has been described above concisely. The details of the invention will become more apparent when the modes for carrying out the invention (hereinafter referred to as an embodiment) described below are read through with reference to the accompanying drawings.

BRIEF DESCRIPTION OF THE DRAWINGS

FIGS. 9A and 9B illustrate how the float arm is swung with respect to the sensor housing; FIG. 9A is a front view of part of the liquid level detecting device according to the embodiment (the holder is omitted) in a state that the float arm is in contact with a first stopper, and FIG. 9B is a front view of part of the liquid level detecting device according to the embodiment (the holder is omitted) in a state that the float arm is in contact with the one first stopper and one second stopper.

DETAILED DESCRIPTION OF THE EXEMPLARY EMBODIMENTS

Figure 1:
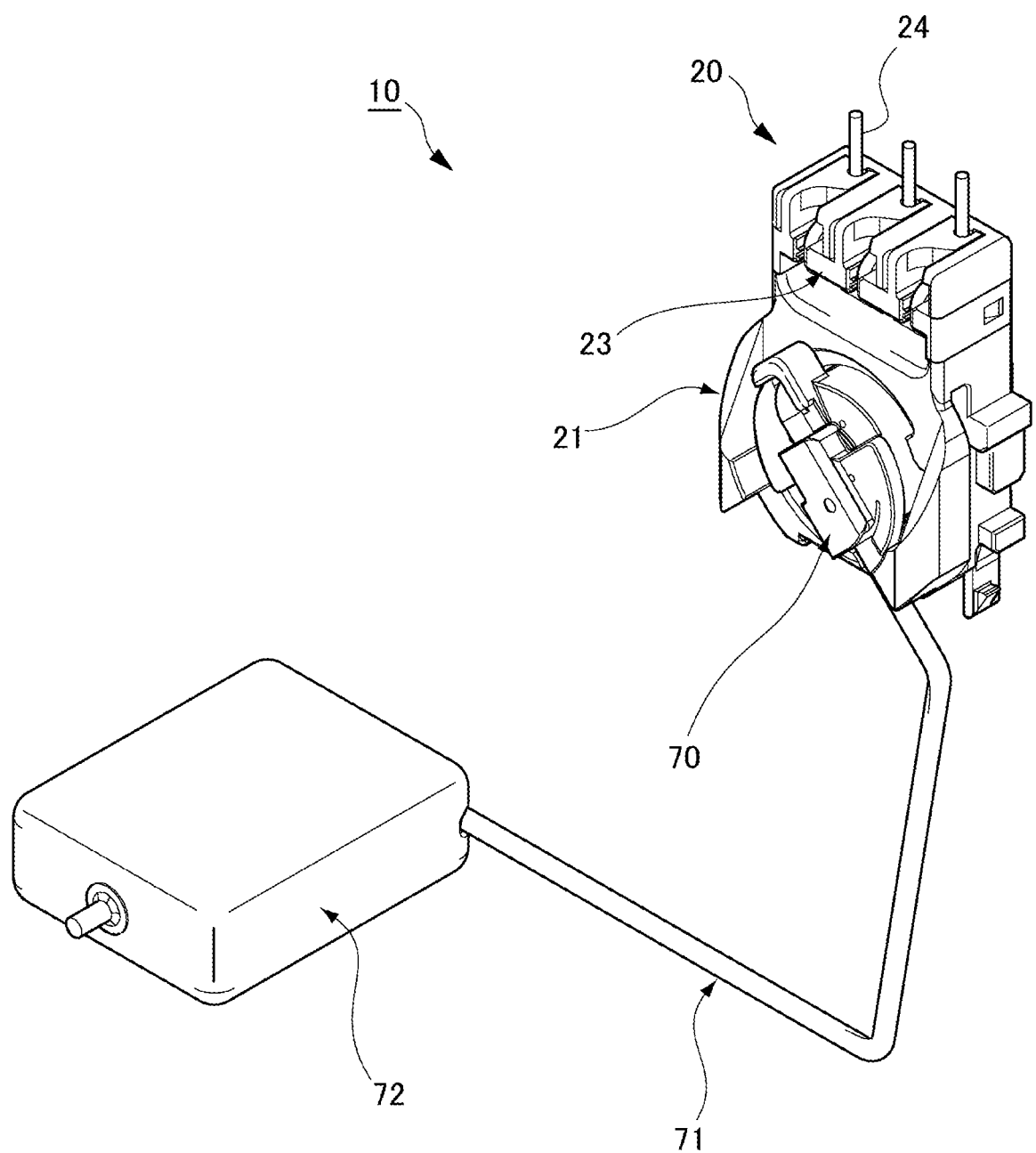
FIG. 1 is a perspective view of the whole of a liquid level detecting device according to an embodiment of the present invention.
Figure 2:
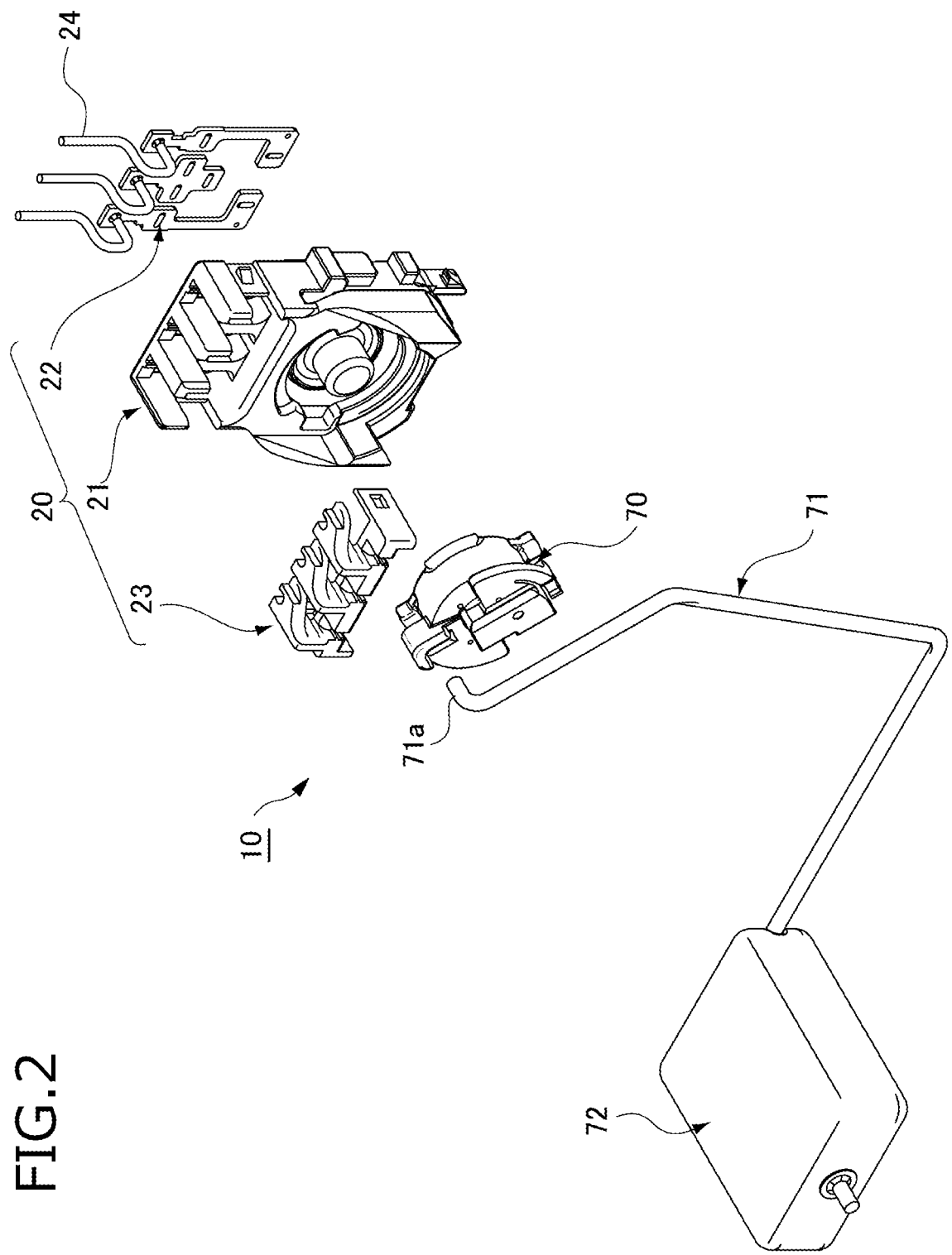
FIG. 2 is an exploded perspective view of the liquid level detecting device according to the embodiment.
Figure 3:
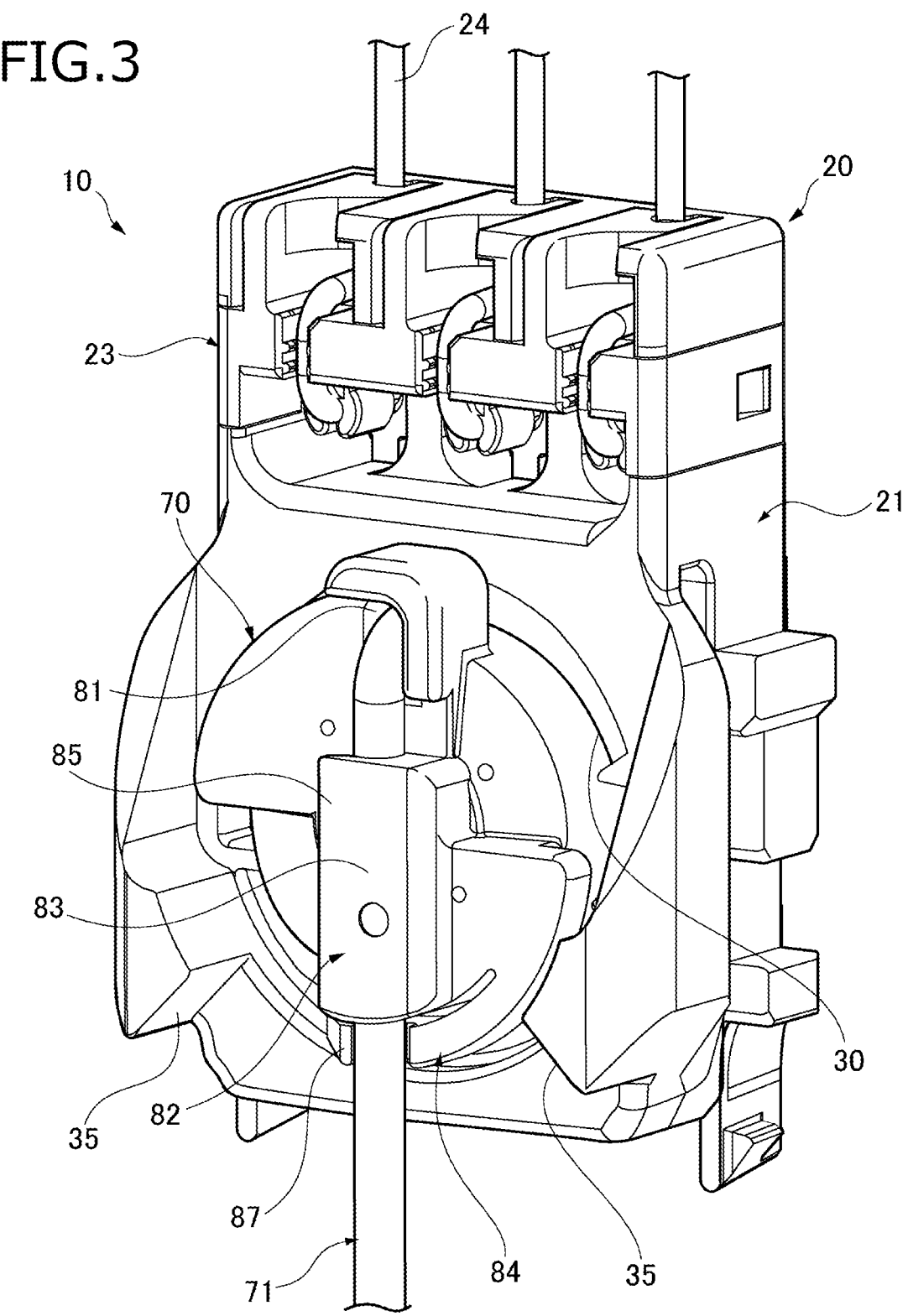
FIG. 3 is a perspective view of an essential part of the liquid level detecting device according to the embodiment.
Figure 4:
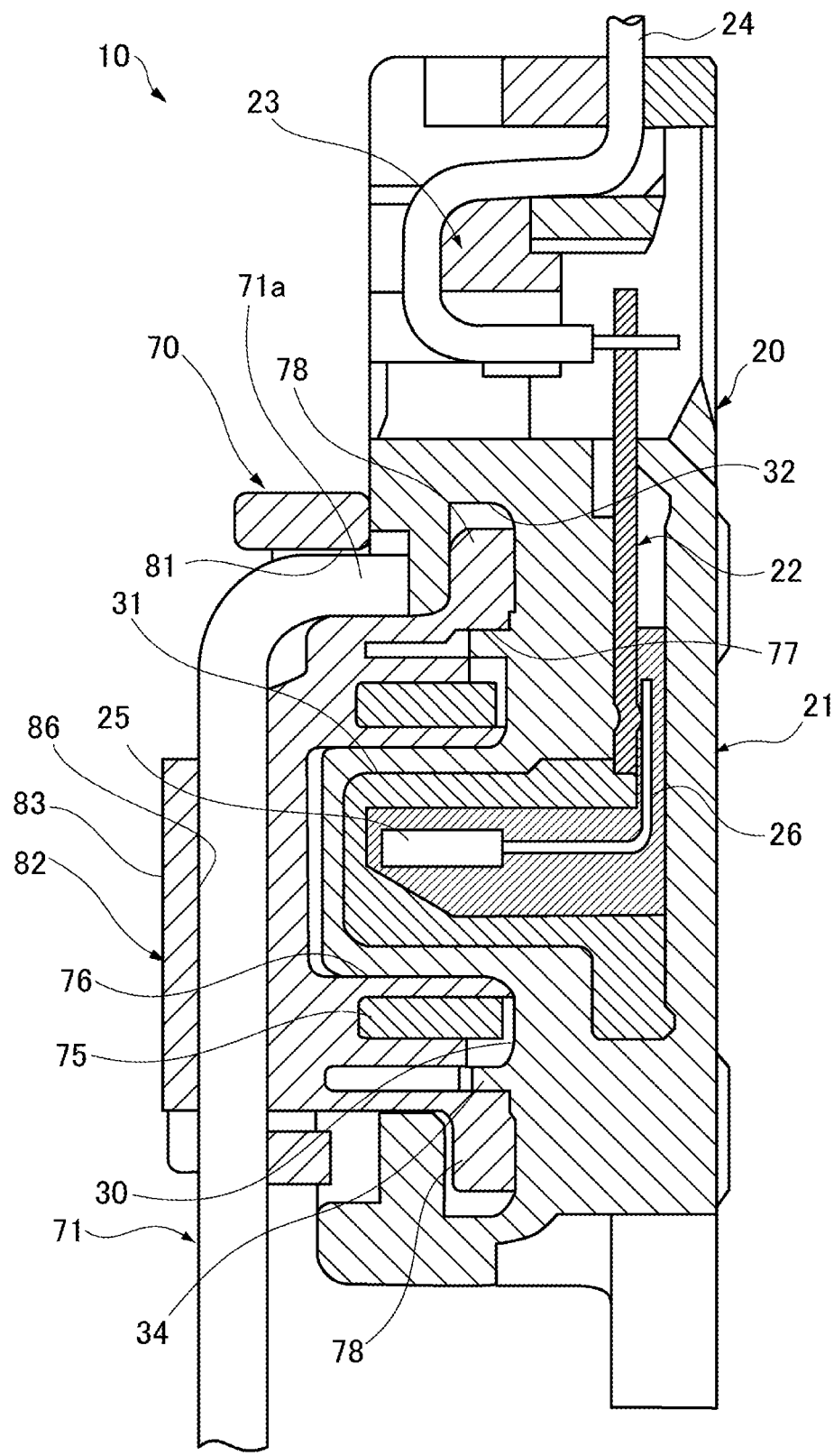
FIG. 4 is a sectional view of the liquid level detecting device according to the embodiment.

An embodiment of the present invention will be hereinafter described with reference to the drawings. FIG. 1 is a perspective view of the whole of a liquid level detecting device 10 according to the embodiment. FIG. 2 is an exploded perspective view of the liquid level detecting device 10. FIG. 3 is a perspective view of an essential part of the liquid level detecting device 10. FIG. 4 is a sectional view of the liquid level detecting device 10.

As shown in FIGS. 1 and 2, the liquid level detecting device 10 according to the embodiment is equipped with a device main body 20, a holder 70, a float arm 71, and a float 72. The device main body 20 is equipped with a sensor housing 21, a terminal 22, and a holding member 23.

As shown in FIGS. 3 and 4, the terminal 22 and the holding member 23 are attached to the sensor housing 21. A lead 26 of a Hall element 25 which is provided inside the sensor housing 21 is electrically connected to the terminal 22. Detection wires 24 which are held by the holding member 23 are connected to the terminal 22 and lead out from the top of the sensor housing 21.

A base portion of the float arm 71 is connected to the holder 70. The float 72 is fixed to the other end portion, which is a free end portion, of the float arm 71. The holder 70 which is circular and has a circular-ring-shaped magnet 75 inside is attached to a front portion of the sensor housing 21 and held by it rotatably. The holder 70 has an axial recess 76 at its center on the rear side. The magnet 75 is disposed outside the axial recess 76. The holder 70 is formed with a guide recess 77 on the rear side outside the magnet 75. The holder 70 also has a pair of brims 78 at top and bottom positions on its circumference on the rear side. The brims 78 project outward in opposite radial directions.

The liquid level detecting device 10 is attached to an attachment target portion of, for example, a fuel tank that is installed in a vehicle such as an automobile, and detects a liquid level of a fuel stored inside the fuel tank.

In the liquid level detecting device 10, the float arm 71 swings as the float 72 moves following the liquid surface. And the holder 70 to which the float arm 71 is connected rotates with respect to the device main body 20. In response, the Hall element 25 which is provided in the device main body 20 detects a variation of the magnetic flux generated by the magnet 75 which is provided in the holder 70 and a detection result is sent to a measuring unit through the detection wires 24. The measuring unit determines a liquid level on the basis of the detection result received from the Hall element 25, and issues a warning if necessary. For example, the measuring unit issues a warning of a fuel shortage of the fuel tank.

Figure 5:
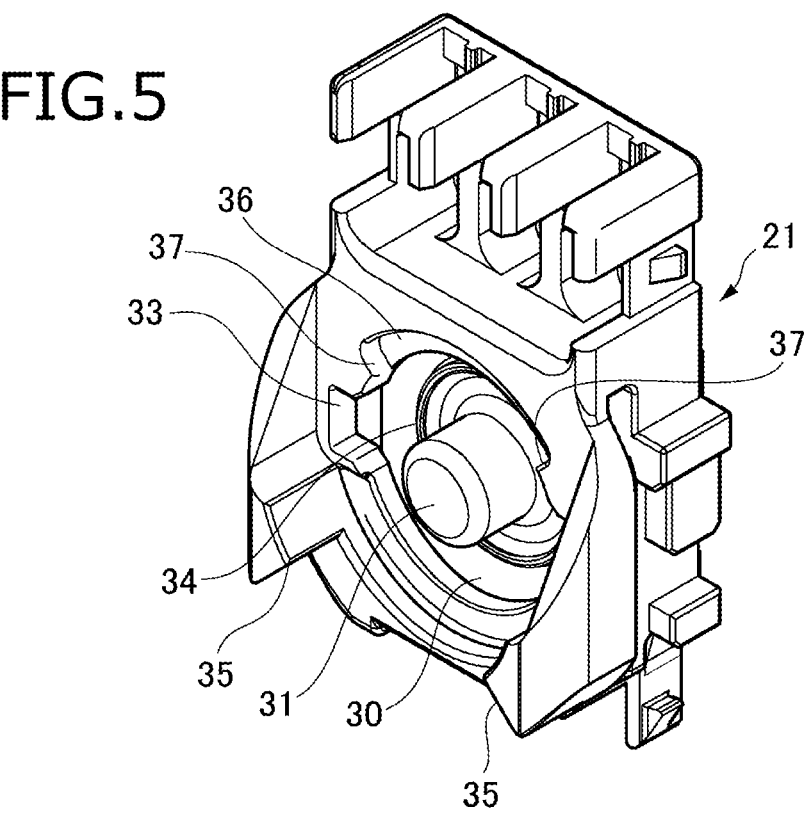
FIG. 5 is a perspective view of a sensor housing.
Figure 6:
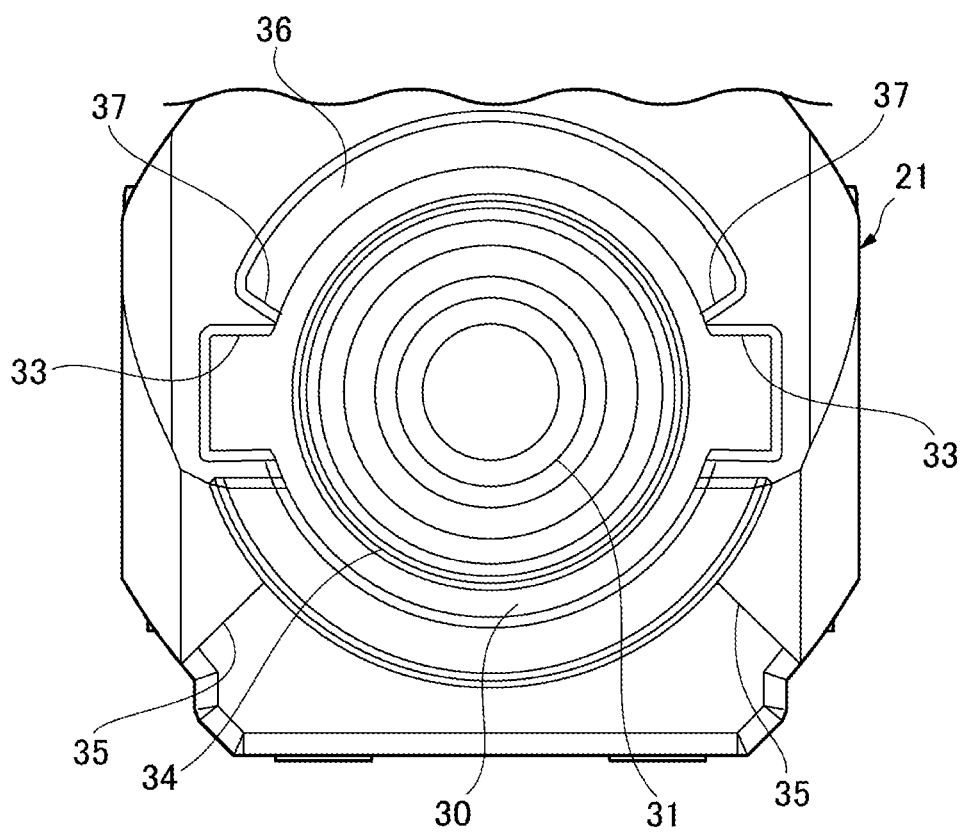
FIG. 6 is a front view of part of the sensor housing.

FIG. 5 is a perspective view of the sensor housing 21. FIG. 6 is a front view of part of the sensor housing 21.

As shown in FIGS. 5 and 6, the sensor housing 21 of the device main body 20 has, on the front side, a rotation recess 30 in which the holder 70 is set rotatably. The rotation recess 30 is circular in a front view. A shaft portion 31 which is provided with the Hall element 25 projects at the center in the rotation recess 30. In the sensor housing 21, a lock groove 32 is formed over the full circumference adjacent to an outside portion of the rotation recess 30 (see FIG. 4). The sensor housing 21 is formed with a pair of insertion holes 33 on the front side at opposite positions (i.e., left and right positions) on the circumference of the rotation recess 30. The insertion holes 33 communicate with the lock groove 32. A guide projection strip 34 is formed over the full circumference at the bottom of the rotation recess 30 so as to surround the shaft portion 31.

A pair of first stoppers 35 project at front positions of the sensor housing 21 below the center of the rotation recess 30. The first stoppers 35 are located outside the rotation recess 30 so as to be spaced from each other in the left-right direction. The front circumferential edge of the rotation recess 30 of the sensor housing 21 is formed with a rotation groove 36 and second stoppers 37. The rotation groove 36 is formed at the top of the rotation recess 30 between the insertion holes 33. The second stoppers 37 are formed at the two respective ends of the rotation groove 36.

Figure 7A:
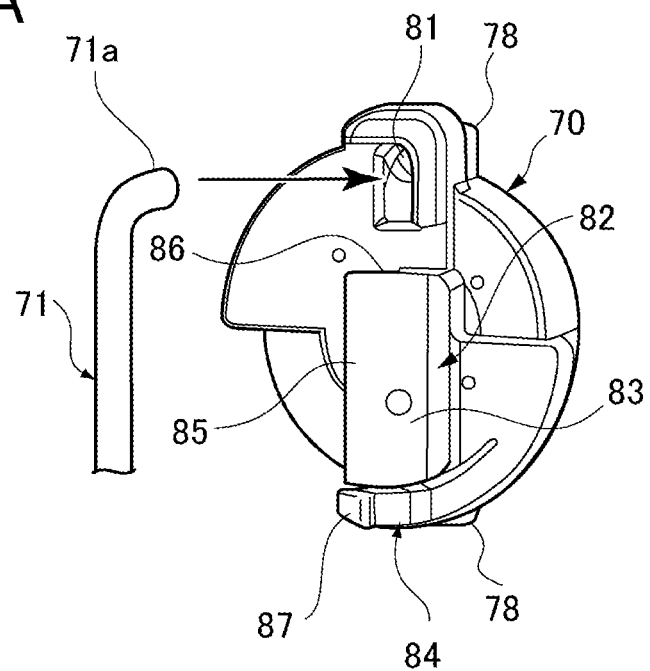
FIGS. 7A and 7B are perspective views, before and during attachment of a float arm, respectively, and illustrate how the float arm is attached to a holder.
Figure 7B:
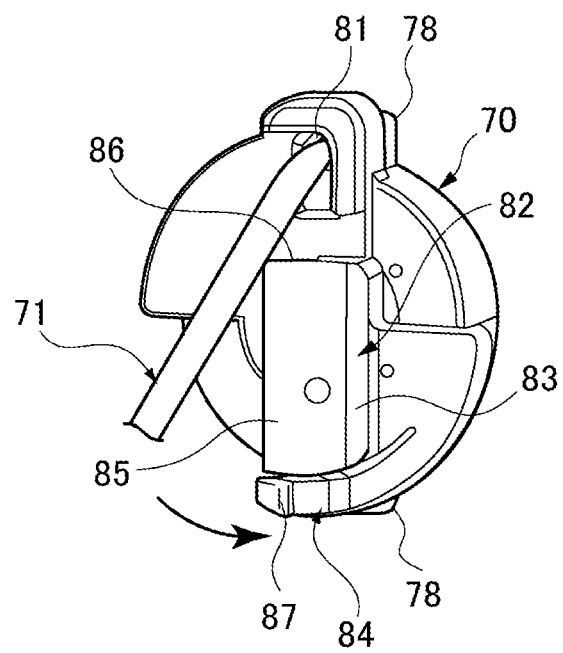

FIGS. 7A and 7B are perspective views, before and during attachment of the float arm 71, respectively, and illustrate how the float arm 71 is attached to the holder 70.

As shown in FIGS. 7A and 7B, the holder 70 has an arm fixing portion 82. The float arm 71 is fixed to the holder 70 by means of the arm fixing portion 82 so as to extend perpendicularly to and cross the rotation axis O of the holder 70 (see FIG. 8). The arm fixing portion 82 has a lock hole 81, a holding portion 83, and a lock portion 84. The lock hole 81, which is a hole that penetrates through the holder 70 in its thickness direction, is formed in a portion, located on the circumference, of the holder 70. The base portion (one end portion) of the float arm 71 has a lock end portion 71*a* which is bent at a right angle and inserted in the lock hole 81. The lock end portion 71*a* which is inserted in the lock hole 81 is located in the rotation groove 36.

The holding portion 83 is formed on the front surface of the holder 70. The holding portion 83 has a holding piece 85 which projects sideways, and a holding groove 86 is formed between the holding piece 85 and a portion of the front surface of the holder 70 (see FIG. 4). A portion, in the vicinity of its base-side end, of the float arm 71 is fitted into the holding groove 86 from the side. The lock portion 84 is formed in the holding portion 83 on the side opposite to the lock hole 81, and has a nail 87 which projects toward the front side of the holder 70. The nail 87 is locked on a circumferential surface of the float arm 71 that is fitted in the holding groove 86 of the holding portion 83.

To attach the holder 70 to the sensor housing 21, the brims 78 of the holder 70 are set opposed to the respective insertion holes 33 of the sensor housing 21 and then the holder 70 is fitted into the rotation recess 30. As a result, the brims 78 are inserted through the respective insertion holes 33 and the shaft portion 31 of the sensor housing 21 is inserted into the axial recess 76 of the holder 70. And the guide projection strip 34 of the sensor housing 21 goes into the guide recess 77 of the holder 70.

Subsequently, the holder 70 that is fitted in the rotation recess 30 is rotated so that the lock hole 81 will be located at the top. As a result, the brims 78 of the holder 70 go into the lock groove 32 of the sensor housing 21, whereby the holder 70 is prevented from coming off the rotation recess 30 of the sensor housing 21.

To attach the float arm 71 to the holder 70, first, the lock end portion 71*a* which is part of the base portion of the float arm 71 is inserted into the lock hole 81 of the holder (see FIG. 7A).

Subsequently, the float arm 71 is rotated with the lock end portion 71*a* (inserted in the lock hole 81) as a supporting point and a portion, in the vicinity of its base-side end, of the float arm 71 is fitted into the holding groove 86 of the holding portion 83 from the side (see FIG. 7B). As a result, the portion, in the vicinity of its base-side end, of the float arm 71 is held by the holding portion 83 and a circumferential surface of the float arm 71 is locked on the nail 87 of the lock portion 84. In this manner, the base portion is fixed to the holder 70.

Figure 8:
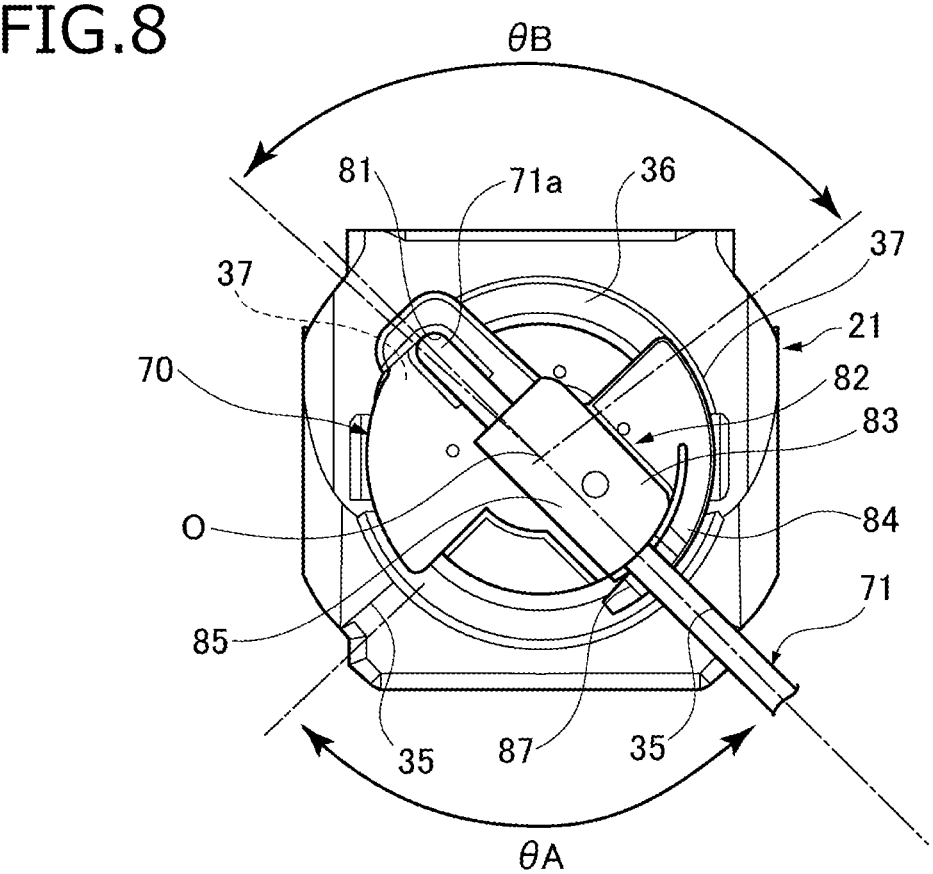
FIG. 8 is a front view of part of the liquid level detecting device according to the embodiment and illustrates a rotation angle range of the holder.

FIG. 8 is a front view of part of the liquid level detecting device 10 and illustrates a rotation angle range of the holder 70. FIGS. 9A and 9B illustrate how the float arm 71 is swung with respect to the sensor housing 21; FIG. 9A is a front view of part of the liquid level detecting device 10 (the holder 70 is omitted) in a state that the float arm 71 is in contact with one first stopper 35, and FIG. 9B is a front view of part of the liquid level detecting device 10 (the holder 70 is omitted) in a state that the float arm 71 is in contact with the one first stopper 35 and one second stopper 37.

In the liquid level detecting device 10, as shown in FIG. 8, when the holder 70 is rotated, a portion, closer to its tip than the position on it where it crosses the rotation axis O of the holder 70 is, of the float arm 71 comes into contact with a first stopper 35. In this manner, the rotation angle range of the holder 70 is restricted to a first rotation angle range $\theta_A$. Since the rotation angle range of the holder 70 is restricted in this manner, an event can be prevented that the brims 78 of the holder 70 are moved to the positions of the insertion holes 33 and the holder 70 comes off the sensor housing 21.

In the liquid level detecting device 10, the lock end portion 71*a* of the float arm 71 can come into contact with a second stopper 37 when the holder 70 is rotated further. Since the lock end portion 71*a* can come into contact with the pair of second stoppers 37, the rotation angle range of the holder 70 is restricted to a second rotation angle range $\theta_B$.

The second rotation angle range $\theta_B$ is wider than the first rotation angle range $\theta_A$. That is, the first rotation angle range $\theta_A$ and the second rotation angle range $\theta_B$ satisfy the following Inequality (1):

$$\theta_A < \theta_B. \qquad (1)$$

When as shown in FIG. 9A the portion, closer to its tip than the position on it where it crosses the rotation axis O of the holder 70 is, of the float arm 71 comes into contact with a first stopper 35, the lock end portion 71*a* of the float arm 71 is not in contact with a second stopper 37 and a gap exists between them.

In the above-configured liquid level detecting device 10, the pair of first stoppers 35 restrict the rotation of the holder 70 in such a manner that the portion, closer to its tip than the position on it where it crosses the rotation axis O of the holder 70 is, of the float arm 71 comes into contact with one of the first stoppers 35. Thus, the torque acting on the arm fixing portion 82 for fixing the float arm 71 can be made as weak as possible in contrast to the case of a structure in which the rotation of the holder 70 is restricted in such a manner that a portion, closer to its base-side end than the position on it where it crosses the rotation axis O of the holder 70 is, of the float arm 71 comes into contact with a stopper.

As shown in FIG. 9B, if an overload F is exerted on the float arm 71, the float arm 71 comes into contact with a first stopper 35 with a strong force. As a result, in the liquid level detecting device 10, the float arm 71 is curved and its lock end portion 71*a* comes into contact with a second stopper 37. In this manner, the overload F applied to the float arm 71 acts on not only the first stopper 35 but also the second stopper 37, that is, the overload F is received by the sensor housing 21 in a distributed manner.

As described above, in the liquid level detecting device 10 according to the embodiment, the first stoppers 35 restrict the rotation of the holder 70 in such a manner that the portion, closer to its tip than the position on it where it crosses the rotation axis O of the holder 70 is, of the float arm 71 comes into contact with one of the first stoppers 35. Thus, the torque acting on the arm fixing portion 82 (of the holder 70) for fixing the float arm 71 can be made as weak as possible in contrast to the case of a structure in which the rotation of the holder 70 is restricted in such a manner that a portion, closer to its base-side end than the position on it where it crosses the rotation axis O of the holder 70 is, of the float arm 71 comes into contact with a stopper. With this measure, even if a strong force is applied to the float arm 71 as a result of the float arm 71's coming into contact with a nearby member at the time of, for example, assembling, a resulting load acting on the arm fixing portion 82 can be suppressed. As a result, the arm fixing portion 82 can endure a load applied from the float arm 71 without the need for reinforcing the arm fixing portion 82 with a cost or size increase.

Since the load applied to the holder 70 is suppressed, the load acting on the portions such as the shaft portion 31 (of the sensor housing 21) for supporting the holder 70 is reduced. As a result, the influence of resulting deformation etc. of the support portions on detection of a liquid surface level can be suppressed and high detection accuracy can be maintained.

Furthermore, in the liquid level detecting device 10 according to the embodiment, if an overload F is exerted on the float arm 71, the float arm 71 being in contact with a first stopper 35 comes into contact with a second stopper 37. In this manner, the overload F applied to the float arm 71 is received in a distributed manner by the first stopper 35 and the second stopper 37. Thus, the load on the arm fixing portion 82 can be reduced further.

The invention is not limited to the above embodiment and various modifications, improvements, etc. can be made as appropriate. The materials, shapes, sets of dimensions, numbers, locations, etc. of the respective constituent elements of the above embodiment are not limited to those disclosed but can be determined in desired manners as long as the invention can be implemented.

Features of the liquid level detecting device 10 according to the embodiment of the invention will be summarized concisely below in the forms of items [1] to [5]:

[1] A liquid level detecting device (10) including:
a sensor housing (21);
a holder (70) which is held rotatably by the sensor housing 21);
an arm fixing portion (82) provided in the holder (70);
a float arm (71) which has a base portion fixed to the holder (70) by the arm fixing portion (82);
a float (72) which is attached to a tip portion of the float arm (71) and varies in position following a surface level of liquid stored in a tank;
a magnet (75) provided in the holder (70); and
a Hall element (25) which is provided in the sensor housing (21) and detects a displacement of the magnet (25) of the holder (70),
wherein the float arm (71) is fixed to the holder (70) so as to extend in a direction perpendicular to and cross to a rotation axis of the holder (70); and
wherein the sensor housing (21) has a pair of first stoppers (35) which restrict a rotation angle range of the holder (70) to a first rotation angle by bringing a portion of the float arm (71), which is positioned between a tip of the float arm and the rotation axis (O), into contact with one of the pair of first stoppers (35).

[2] The liquid level detecting device (10) according to item [1], wherein the sensor housing (21) has a pair of second stoppers (37) which restrict the rotation angle range of the holder (70) to a second rotation angle which is wider than the first rotation angle of the pair of first stoppers (35) by bringing a portion of the float arm (70), which is positioned between a base end of the float arm (70) and the rotation axis (O), into contact with one of the pair of second stoppers (37).

[3] The liquid level detecting device according to item [2], wherein a first distance between the rotation axis (O) and a first contact position where the float arm (71) is brought into contact with the one of the pair of first stoppers (35) is longer than a second distance between the rotation axis (O) and a second contact position where the float arm (71) is brought into contact with the one of the pair of second stoppers (37).

[4] The liquid level detecting device according to the item [2] or [3], wherein the float arm (71) is brought into contact with the one of the pair of second stoppers (35) when the holder (70) is rotated further after the float arm (71) is brought into contact with the one of the pair of first stoppers (35).

[5] The liquid level detecting device according to any one of the items [2] to [4], wherein an air gap is existed between the one of the pair of second stopper (37) and the portion of the float arm (71), which is positioned between the base end of the float arm and the rotation axis (O) at a timing when the float arm (71) is brought into contact with the one of the pair of first stoppers (35).

What is claimed is:

1. A liquid level detecting device comprising:
a sensor housing;
a holder which is held rotatably by the sensor housing;
an arm fixing portion provided in the holder;
a float arm which has a base portion fixed to the holder by the arm fixing portion, and which has a tip portion attached to a float;
the float which is attached to the tip portion of the float arm and varies in position following a surface level of liquid stored in a tank;
a magnet provided in the holder; and
a Hall element which is provided in the sensor housing and detects a displacement of the magnet of the holder,
wherein the float arm is fixed to the holder so as to extend in a direction perpendicular to a rotation axis of the holder and that crosses the rotation axis of the holder;
wherein the sensor housing has a pair of first stoppers which restrict a rotation angle range of the holder to a first rotation angle by bringing a portion of the float arm, which is positioned between the tip portion of the float arm and the rotation axis, into contact with one of the pair of first stoppers;
wherein the sensor housing has a pair of second stoppers which restrict the rotation angle range of the holder to a second rotation angle which is wider than the first rotation angle of the pair of first stoppers by bringing another portion of the float arm, which is positioned between the base portion of the float arm and the rotation axis, into contact with one of the pair of second stoppers; and
wherein the float arm is brought into contact with the one of the pair of second stoppers when the holder is rotated further after the float arm is brought into contact with the one of the pair of first stoppers.

2. The liquid level detecting device according to claim 1, wherein a first distance between the rotation axis and a first contact position where the float arm is brought into contact with the one of the pair of first stoppers is longer than a second distance between the rotation axis and a second contact position where the float arm is brought into contact with the one of the pair of second stoppers.

3. The liquid level detecting device according to claim 1, wherein an air gap exists between the one of the pair of second stopper and another portion of the float arm, which is positioned between the base end portion of the float arm and the rotation axis at a timing when the portion of the float arm is brought into contact with the one of the pair of first stoppers.

* * * * *